United States Patent [19]

Rupprecht

[11] 4,232,765
[45] Nov. 11, 1980

[54] DRUM BRAKE

[75] Inventor: Kurt Rupprecht, Wolfsburg, Fed. Rep. of Germany

[73] Assignee: Volkswagenwerk Aktiengesellschaft, Wolfsburg, Fed. Rep. of Germany

[21] Appl. No.: 4,218

[22] Filed: Jan. 17, 1979

[30] Foreign Application Priority Data

Feb. 6, 1978 [DE] Fed. Rep. of Germany ....... 2804938

[51] Int. Cl.³ ............................................ F16D 65/09
[52] U.S. Cl. ................................................. 188/78
[58] Field of Search ................... 74/519, 532; 188/78, 188/106 A, 79.5 GC, 196 P, 340; 267/161

[56] References Cited

U.S. PATENT DOCUMENTS

| 2,747,166 | 5/1956 | Hoffarth | 267/161 X |
| 3,223,204 | 12/1965 | Chouings | 188/196 P X |
| 4,039,055 | 8/1977 | Meyer et al. | 188/79.5 GC |

FOREIGN PATENT DOCUMENTS 1478051  6/1977  United Kingdom .

Primary Examiner—Duane A. Reger
Attorney, Agent, or Firm—Spencer & Kaye

[57] ABSTRACT

A drum brake includes a brake shoe having a web, a hand brake lever pivotally attached to the brake shoe by a rivet extending through the hand brake lever and the web and having a stepped rivet shaft formed of adjoining first and second rivet shaft portions and a spring disc mounted on the rivet shaft to compensate for a play between the web and the hand brake lever. The spring disc is situated between the hand brake lever and the web and is firmly riveted to the web by the first rivet shaft portion passing through the hand brake lever. The spring disc has a central radial annular portion of an outer diameter which is greater than the diameter of the first rivet shaft portion. The spring disc further has at least one spring tab starting at the end of the outer diameter of the annular disc portion and extends out of the plane thereof.

2 Claims, 4 Drawing Figures

DRUM BRAKE

BACKGROUND OF THE INVENTION

This invention relates to a drum brake including an emergency brake lever (hereafter hand brake lever) which is riveted for pivotal motion to the web of one of the brake shoes by means of a rivet having a stepped shaft. A spring disc is arranged on the rivet shaft for compensating for the play between the web and the hand brake lever. The rivet shaft portion adjoining the rivet head has the relatively large diameter and serves for the pivotal support of the hand brake lever on the web. The rivet shaft portion of reduced diameter passes through a corresponding bore in the web and is riveted to the web of the brake shoe. The rivet shaft portion of the larger diameter thus abuts firmly the web without undergoing an increase in diameter. To compensate for the unavoidable clearance between the hand brake lever and the web, a wavy spring disc is provided on the rivet shaft between the rivet head and the hand brake lever. The spring disc urges the hand brake lever against the web of the brake shoe.

If, in the above-outlined, generally satisfactory conventional construction the hand brake is not actuated for a longer period of time, the risks are high that the hand brake lever, because of corrosion that has developed on its face engaging the web, can no longer move with ease and thus the return force of the conventional return spring may not be sufficient to pull the hand brake lever back into its position of rest. Further, in the course of the mounting operation, the spring disc has to be inserted on the rivet shaft with particular circumspection in such a manner that its wavy side is oriented towards the hand brake lever, otherwise the desired spring effect cannot be obtained. Therefore, the mounting of the hand brake lever has to be effected with great care. In order to reduce the tendency of corrosion between the hand brake lever and the web of the brake shoe it would be in principle possible to place the wavy spring disc on the inner side of the hand brake lever, that is, between the hand brake lever and the web. In such an arrangement of the spring disc, however, the risks would be high that the spring disc, during riveting, would slip from the rivet shaft portion of greater diameter to the rivet shaft portion of smaller diameter and would jam between the rivet and the web resulting in an inoperativeness of the entire structural unit. This would be so, because the rivet which serves as a bearing shaft, would assume an orientation different from its usual orientation which is perpendicular to the plane of the web. Further, it is not possible to dimension in advance the inner diameter of the wavy spring disc such that the spring disc is supported not on the rivet shaft portion of larger diameter but, from the very beginning, on the rivet shaft portion of the smaller diameter, because then the wavy spring disc would be riveted to the web resulting in a loss of its springing motion.

SUMMARY OF THE INVENTION

It is an object of the invention to provide an improved drum brake of the above-outlined type and particularly to so design the support of the hand brake lever on the web of the brake shoe that the risks of corrosion which could obstruct a free motion of the hand brake lever with respect to the web are eliminated and the mounting of the hand brake lever is facilitated.

This object and others to become apparent as the specification progresses, are accomplished by the invention, according to which, briefly stated, the drum brake includes a brake shoe having a web, a hand brake lever pivotally attached to the brake shoe by a rivet extending through the hand brake lever and the web and having a stepped rivet shaft formed of adjoining first and second rivet shaft portions and a spring disc mounted on the rivet shaft to compensate for a play between the web and the hand brake lever. The spring disc is situated between the hand brake lever and the web and is firmly riveted to the web by the first shaft portion passing through the hand brake lever. The spring disc has a central radial annular portion of an outer diameter which is greater than the diameter of the first rivet shaft portion. The spring disc further has at least one spring tab starting at the end of the outer diameter of the annular disc portion and extends out of the plane thereof.

DESCRIPTION OF THE PREFERRED EMBODIMENT

Figure 1:
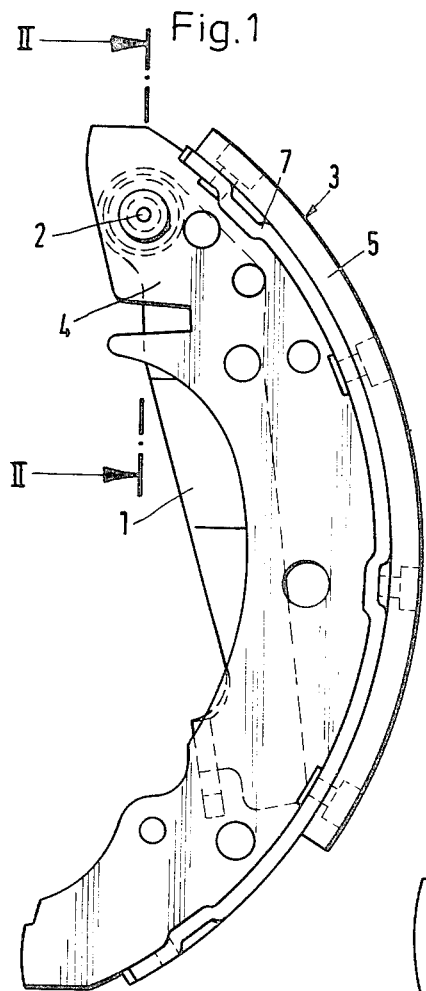
FIG. 1 is a side elevational view of a brake shoe of a drum brake incorporating the invention.
Figure 2:
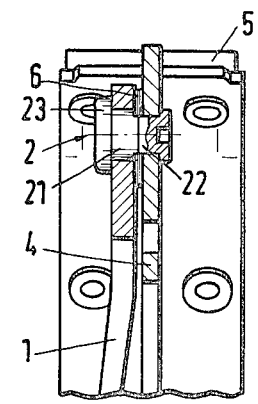
FIG. 2 is a sectional view taken along line II—II of FIG. 1.

Turning now to FIGS. 1 and 2, the brake shoe of a drum brake shown therein has a web 4 articulated in a conventional manner to a brake carrier (not shown), a lining support 7 and a brake lining 5 bonded to the lining support 7. To the web 4 there is articulated a hand brake lever 1 by means of a rivet 2 and is connected with a hand brake cable (not shown). The rivet 2 has a rivet head 23 and two rivet shaft portions 21 and 22. The first rivet shaft portion 21 adjoining the rivet head 23 serves as the pivot pin for the hand brake lever 1 and has a diameter which is greater than that of the adjoining, second rivet shaft portion 22 which passes through the web 4.

Figure 3:
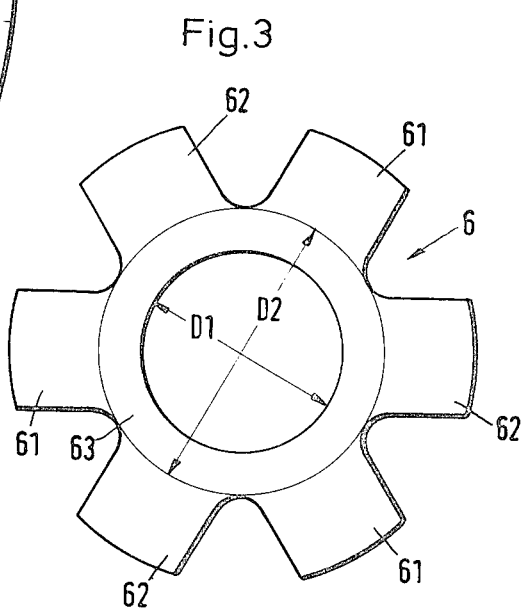
FIG. 3 is an enlarged plan view of a component according to the invention.
Figure 4:
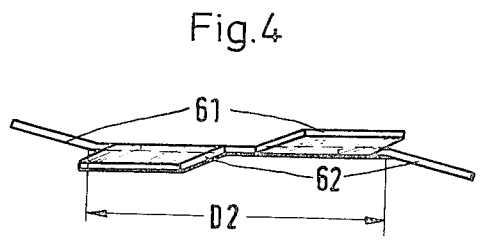
FIG. 4 is a lateral view of the component shown in FIG. 3.

Between the hand brake lever 1 and the web 4 there is arranged a spring disc 6 of the type shown enlarged in FIGS. 3 and 4. The inner diameter D1 of the spring disc 6 is so designed that the spring disc sits on the rivet shaft portion 22 and as a result of the riveting operation, it is firmly pressed (riveted) against the web 4 along the zone of its entire inner circumference by the shoulder formed by the rivet shaft portion 21 of greater diameter. As a result of the riveting operation, the rivet shaft portion 21 is drawn firmly against the spring disc 6 and the web 4 without undergoing an increase in diameter.

As illustrated in FIGS. 3 and 4, the spring disc 6 which is made, for example, of spring steel, has a planar (radial) central, annular base portion 63 which has an outer diameter D2 and from which extend radially outwardly a plurality (such as six) of circumferentially distributed, symmetrically arranged spaced spring tabs 61 and 62. The outer diameter D2 is slightly larger than the rivet shaft portion 21. The spring tabs start at the outer diameter D2 of the base portion 63 and, when viewed in the circumferential direction of the spring disc, are oriented alternatingly towards the one and the other axial direction of the spring disc and are thus arranged at an inclined angle with respect to the plane of the base portion 63. It may thus be observed in FIG. 4 that tabs 61 are bent towards the one axial direction, whereas the tabs 62 are bent towards the other axial direction. Thus, during the riveting operation, only those spring tabs which are oriented towards the web 4 (for example, all the spring tabs 61) are bent into a straightened position, while the spring tabs oriented towards the hand brake lever 1 (for example, the spring tabs 62) engage resiliently the hand brake lever 1 and thus compensate for the clearance between the web 4 and the hand brake lever 1.

A corrosion between the hand brake lever and the web which would adversely affect the free mobility of the hand brake lever does not occur in this arrangement. Further, there is also no danger that the spring disc, during the riveting operation, is wedged between the rivet and the web thus rendering the unit inoperative, because the inner diameter D1 of the spring disc is in advance so selected that it can be inserted only on the rivet shaft portion 22 of smaller diameter. The entirely symmetrical spring disc shown in the illustrated example and having spring tabs bent alternatingly into the one and the other direction, has the particular advantage that during mounting it can be simply positioned on the rivet shaft portion 22 without the need to exercise particular care, for example, as concerns its orientation.

Instead of the spring disc illustrated in FIGS. 3 and 4, it is, in principle, feasible to use a spring disc which has resilient tabs oriented only in one direction. When such a spring disc is used, however, during the mounting operation particular care has to be taken that the bent spring tabs are positioned on the rivet shaft portion 22 in such a manner that the spring tabs are oriented towards the hand brake lever 1. Such an arrangement too, results in a no-clearance, corrosion-free support of the hand brake lever. It is noted, however, that this arrangement does not have the advantage of the first-described embodiment concerning a particularly easy mounting, because the spring disc has to be inserted with particular care regarding its orientation.

It is further noted that the number of spring tabs is not limited to that of the described embodiment. In principle, a single spring tab oriented towards the hand brake lever would suffice. Such an arrangement, however, would not possess the same stability and operational ease as the use of a spring disc of the symmetrical type as described in connection with FIGS. 3 and 4.

It is to be understood that the above description of the present invention is susceptible to various modifications, changes and adaptations and the same are intended to be comprehended within the meaning and range of equivalents of the appended claims.

What is claimed is:

1. In a drum brake including a bake shoe having a web, a hand brake lever pivotally attached to the brake shoe by a rivet extending through the hand brake lever and the web and having a stepped rivet shaft formed of adjoining first and second rivet shaft portions, a spring disc mounted on the rivet shaft to compensate for a play between the web and the hand brake lever; the improvement wherein said spring disc is situated between said hand brake lever and said web and is firmly riveted to said web by said first rivet shaft portion passing through said hand brake lever; said spring disc having a central radial annular portion of an outer diameter which is greater than the diameter of said first rivet shaft portion; said spring disc further having at least one radial spring tab starting at the end of said outer diameter and extending out of the plane of said central radial annular portion of said spring disc.

2. A drum brake as defined in claim 1, wherein said spring disc has at least two radial spring tabs oriented in opposite directions relative to said plane.

* * * * *